(12) United States Patent
Panzani et al.

(10) Patent No.: US 10,940,911 B2
(45) Date of Patent: Mar. 9, 2021

(54) MOTORCYCLE WITH IMPROVED ACTION ELECTRONIC STEERING DAMPER

(71) Applicants: DUCATI MOTOR HOLDING S.P.A., Bologna (IT); POLITECNICO DI MILANO, Milan (IT)

(72) Inventors: Giulio Panzani, Monza (IT); Fabio Busnelli, Saronno (IT); Sergio Matteo Savaresi, Cremona (IT); Pierluigi Zampieri, Sala Bolognese (IT); Marco Lozej, Ponte San Pietro (IT)

(73) Assignees: DUCATI MOTOR HOLDING S.P.A., Bologna (IT); POLITECNICO DI MILANO, Milan (IT)

( * ) Notice: Subject to any disclaimer, the term of this patent is extended or adjusted under 35 U.S.C. 154(b) by 230 days.

(21) Appl. No.: 16/176,356

(22) Filed: Oct. 31, 2018

(65) Prior Publication Data

US 2019/0127013 A1 May 2, 2019

(30) Foreign Application Priority Data

Nov. 2, 2017 (IT) .......................... 102017000124803

(51) Int. Cl.
| | |
|---|---|
| *B62K 21/08* | (2006.01) |
| *B62K 11/04* | (2006.01) |
| *B62K 21/18* | (2006.01) |
| *B62J 99/00* | (2020.01) |
| *B62J 35/00* | (2006.01) |
| *B62J 45/00* | (2020.01) |

(52) U.S. Cl.
CPC ............... *B62K 21/08* (2013.01); *B62J 99/00* (2013.01); *B62K 11/04* (2013.01); *B62K 21/18* (2013.01); *B62J 35/00* (2013.01); *B62J 45/00* (2020.02)

(58) Field of Classification Search
CPC ........ B62K 21/08; B62K 11/04; B62K 21/18; B62J 99/00; B62J 45/00; B62J 35/00
See application file for complete search history.

(56) References Cited

FOREIGN PATENT DOCUMENTS

| EP | 2050667 A1 | 4/2009 |
|---|---|---|
| WO | 2011054404 A1 | 5/2011 |
| WO | 2012149980 A1 | 11/2012 |

OTHER PUBLICATIONS

Search Report and Written Opinion dated Jul. 4, 2018 for Italian patent application No. 102017000124803.

*Primary Examiner* — Anne Marie Antonucci
(74) *Attorney, Agent, or Firm* — Vorys, Sater, Seymour and Pease LLP

(57) ABSTRACT

A motorcycle has a front part and a rear part, the front part including handlebars and a handlebar stem with which there is associated an electronic damper controlled by a control unit controlling the action of the damper on the handlebars, provision being made for a device detecting the angle of rotation of the handlebars and the velocity of rotation of the handlebar stem within a handlebar head of the frame. The control unit includes a first block which receives data on the velocity of rotation of the handlebar stem and which on the basis of such velocity determines the presence of oscillating or weave movement of the motorcycle or a wobble movement of the handlebars, the first block of the control unit being connected to a second block and a third block of such unit which alternatively generate a control signal intended to damp the handlebar stem on the basis of the determination made by the first block so that any weave and/or wobble movement is cancelled out.

20 Claims, 5 Drawing Sheets

MOTORCYCLE WITH IMPROVED ACTION ELECTRONIC STEERING DAMPER

This claims the benefit of Italian patent application no. 102017000124803, filed Nov. 2, 2017, hereby incorporated by reference in its entirety.

The object of the present invention is a motorcycle provided with a steering damper according to the precharacterising clause of the principal claim.

As is known, when a motorcycle is ridden stresses are generated upon it caused by dynamic forces acting on the wheels or directly on the frame of the vehicle. Given that a motorcycle substantially comprises two parts hinged together at the handlebar stem (that is the front part comprising the handlebars and front wheel and a rear part comprising the frame of the motorcycle, the rear wheel, the saddle and the tank), said stresses can give rise to oscillations in only the front part (known as "wobble") or the rear part (known as "weave"). These oscillations correspond to two of the N vibration modes of the kinematic system with N degrees of freedom corresponding to a motorcycle.

In the case of a "wobble" oscillation the handlebars and everything associated with them rotate about the axis of the handlebar stem. Use of a steering damper comprising a first portion associated with the frame of the vehicle and a second portion associated with the handlebars (or any other part of the vehicle's handlebar stem, for example the base of the handlebar stem) in order to compensate for such oscillation is known.

In the case of a weave oscillation the rear part of the vehicle oscillates with undulations of various frequencies which also depend on the speed of the motorcycle; this undulation affects the entire motorcycle and the handlebar stem can also be displaced laterally with respect to the median plane of the vehicle or reference plane. Often a weave oscillation is not limited by the steering damper which instead can make the motorcycle even more unstable by increasing the damping force and amplifying the movement of the handlebars about the handlebar stem axis.

As mentioned, through the use of a steering damper on a motorcycle it is possible to damp out the oscillations of the handlebars and the front part of the vehicle when this is angularly displaced in an uncontrolled way with respect to the median plane of the motorcycle along which it is moving.

The steering damper comprises a first portion which is fixed in relation to the frame of the motorcycle, and a second portion which is firmly attached to the handlebars. In general the damper is of the telescopic type having an oleodynamic function and in this type of embodiment comprises the first portion defined by a cylinder within which a piston defining the second portion moves against a fluid (for example oil).

Electronically controlled dampers comprising one or more electrical valve members (electrically-operated valves) capable of acting on the fluid circuit of the damper to vary response in relation to particular predetermined parameters placed in memory in a control unit to which such devices or electrically-operated valves are connected are known. In particular, depending upon such parameters and the positions of the handlebar stem axis, the said unit controls the individual electrically-operated valves in such a way as to have a desired damping effect on the handlebars through appropriate movement of the piston in the cylinder against the fluid present therein fed by a hydraulic circuit within which such an electrically-operated valve is located.

It is also known that angular oscillations of the front wheel and therefore the handlebar stem of the motorcycle with respect to a reference plane or oscillations of the rear part of the motorcycle are strongly influenced by the condition of the vehicle (for example its speed) and how these can be initiated by particular events, such as rearing of the motorcycle or strong acceleration.

In such cases electronic dampers which act on the handlebars in order to damp out their oscillations with respect to such plane are known.

These solutions are often of different kinds. A first solution comprises a damper acting after the wheel has completed at least one complete oscillation about such plane or after the angle formed by it with the plane has changed from a value other than 0° to a value equal to 0° to then again increase in absolute value. In such movement the wheel passes from one side of the reference plane to the other and returns to the first side: when the wheel reaches the median plane of the vehicle (forming an angle of 0° with that plane before moving again) the damper begins to act on the handlebars.

A second solution adjusts the damper parameters on the basis of the vehicle's speed.

A third type of solution provides for the damper to act on the handlebar stem for the weave or wobble condition only.

The first known solution mentioned above comprises relatively long damping times (in that the steering damper waits to act until aforesaid angle of 0° has been reached for at least a first time) and the motorcycle may be difficult to steer at high speed, causing the rider to slow down. This can have an adverse effect, particularly when the vehicle is used in a competition, in that the rider must "throttle down" to prevent the aforesaid "oscillating" movements about the reference plane giving rise to loss of control of the vehicle. One example of this is that of the wheel falling back onto the ground after rearing (caused for example by acceleration at full power) which if followed by oscillations of the handlebar stem which are prolonged over time make it impossible to steer the motorcycle at high speeds.

Also action of such type does not consider the nature of the oscillations (whether weave or wobble) and for this reason is less effective in damping them. As in fact mentioned, any increase in the damping force generated on the handlebars by the steering damper reduces the wobble effect but amplifies the weave undulation.

Similar comments may be made for the second type of action which adjusts the parameters of the damper to the state of the vehicle, without actually checking whether or notoscillations are present, or even their nature.

As far as the third known solution mentioned above is concerned, its main disadvantage lies in the fact that it is impossible to deal with the occurrence of weave and wobble simultaneously.

WO2011054404 describes a method for identification of wobble during operation of a motorcycle having a chassis and a handlebar; said method comprises the steps of monitoring a motion of the handlebar and deriving a value of at least two relative motion parameters from the monitored motion, said relative motion parameters representing a movement of the handlebar relative to said chassis. One of the two relative motion parameters is based on a frequency of a reciprocal movement of the handlebar, and the other is based on a position of the handlebar. The method also provides to verify a correspondence between the derived values and corresponding predetermined values, thereby identifying wobble.

Therefore the above text merely describes how to identify (and oppose through the steering damper) only wobble movement of the handlebars, but does not describe that the method which is the subject matter of that text is also capable of identifying and counteracting weave motion of the rear part of the motorcycle through the same steering damper.

The above text does not therefore describe any means which can be used to identify whether the motorcycle is affected by a weave and/or wobble movement and also to counteract the weave movement through action on the steering damper.

The method comprises various steps which act on the basis of two lines of action which both start in parallel from a stage in which a signal relating to movement of the handlebars alone is recorded by a suitable sensor and subsequently filtered. WO2011054404 provides for the possibility of detecting a first signal relating to movement of the handlebars with respect to the frame of the motorcycle through a first sensor (placed at one extremity of the steering damper associated with the handlebars), and detecting a second signal relating to the movement of the frame through a second sensor (associated with the other extremity of the steering damper attached to the frame of the motorcycle). However this second signal is used as a reference to filter the first signal and therefore always and only that relating to movement of the handlebars.

After filtering the signal relating to movement of the handlebars is analysed on the basis of the two abovementioned lines of operation in order to derive values relating to the frequency and amplitude respectively of the wobble movement of the handlebars. These values are compared with corresponding preset reference values and if the comparison gives rise to correspondence with the latter, each line of operation generates a signal indicating the presence of oscillations on the handlebars. In this case the presence of wobble on the motorcycle is confirmed and a controller associated with the steering damper (which processes the signal relating to the movement of the handlebars) acts on the damper to counteract such wobble movement.

Thus the abovementioned prior document only describes how to detect and counter wobble movement generated in the motorcycle's handlebars, but does not also describe the detection of weave movement and how possibly to counter it. Text WO2011054404 can also not be considered to suggest detection of the weave movement in that it does not describe the possibility of detecting any undulating movement in the rear part of the motorcycle and does not describe the presence of any sensor firmly attached to such rear part of the motorcycle capable of detecting weave movement.

The sensor located in the zone of attachment to the frame of the damper (where provided) described in the prior document only generates a reference signal to determine the value of the signal detected by the sensor located in the zone of attachment between the steering damper and the handlebars; nothing in the prior document indicates that the signal originating from the second sensor can be used to evaluate oscillations of the rear part of the motorcycle.

EP2050667 describes an electronically controlled damping device which connected to the steering of a motorcycle or a quadricycle (so-called "quads") has a housing that is fixed to a chassis of the vehicle. An electronically controlled throttle device is provided with an electronic control device that is provided for determining a control of the throttle device. An acceleration detecting sensor is provided with the electronic control device that controls the damping device depending upon signals of the acceleration detecting sensor. When high and/or short-term accelerations occur, the throttle device can be activated in order to have the maximum damping effect.

This prior document describes a device capable of controlling the steering damper of a vehicle of the type indicated above in the situation where wobble oscillations arise, but does not describe or suggest anything with regard to control of the steering damper to damp out weave oscillation of the motorcycle.

WO2012149980 describes a completely mechanical device (that is comprising mechanical parts with valve units) to control the damping action of a motorcycle steering damper. This prior document does not provide for electronic control of the steering damper to damp out wobble or weave oscillations of the motorcycle.

There is therefore the problem of using the steering damper in a suitable way so that this component of the motorcycle can contribute not only to damping out a wobble effect in the front part of the motorcycle but also helps to effectively damp out a vehicle weave effect.

The object of the present invention is that of providing a motorcycle with a steering damper of the electronic type which is improved in comparison with the known solutions and in which such damper can act effectively to damp out both wobble and weave oscillations at the same time, contrary to what has been established hitherto.

In particular the object of the invention is to provide such a motorcycle in which the times to action of the steering damper to damp out wobble and weave oscillations are somewhat shortened, even in comparison with the response time of known dampers currently used to damp out only the wobble effect in the front part of the motorcycle.

Another object is that of providing a motorcycle in which the wobble and/or weave oscillation can be determined automatically so as to bring about adequate action by the steering damper not only to damp out the wobble oscillation (as occurs in the state of the art), but also to damp out the weave oscillation, whether the latter is present in isolation or together with wobble.

Another object is that of providing a motorcycle in which the electronic steering damper is ready to act without reference to complete oscillation of the handlebar stem axis and wheel with respect to the reference plane.

Another object is to provide a motorcycle of the abovementioned type in which the action of the electronic steering damper is of the predictive type and in particular such that it is readied for such action when the vehicle rears up.

These and other objects which will be obvious to those skilled in the art are accomplished through a motorcycle provided with an electronic steering damper according to the appended principal claim.

The following purely exemplary and non-limiting drawings are attached for a better understanding of the present invention, and in these:

FIG. 1 shows the front part of a motorcycle according to the invention diagrammatically in perspective view;

FIG. 2 shows a comparison between two sets of graphs, shown side-by-side in part A and part B of the figure, each set of graphs containing a first graph X in which time is plotted as the abscissa and speed as the ordinate, a second graph Y indicating time as the abscissa and, as ordinate, the degrees per second relating to a weave oscillation (graph K) and a wobble oscillation (graph W), a third graph Z indicating time as the abscissa and the amplitude of a control current of a steering damper of the vehicle as ordinate;

Figure 1:
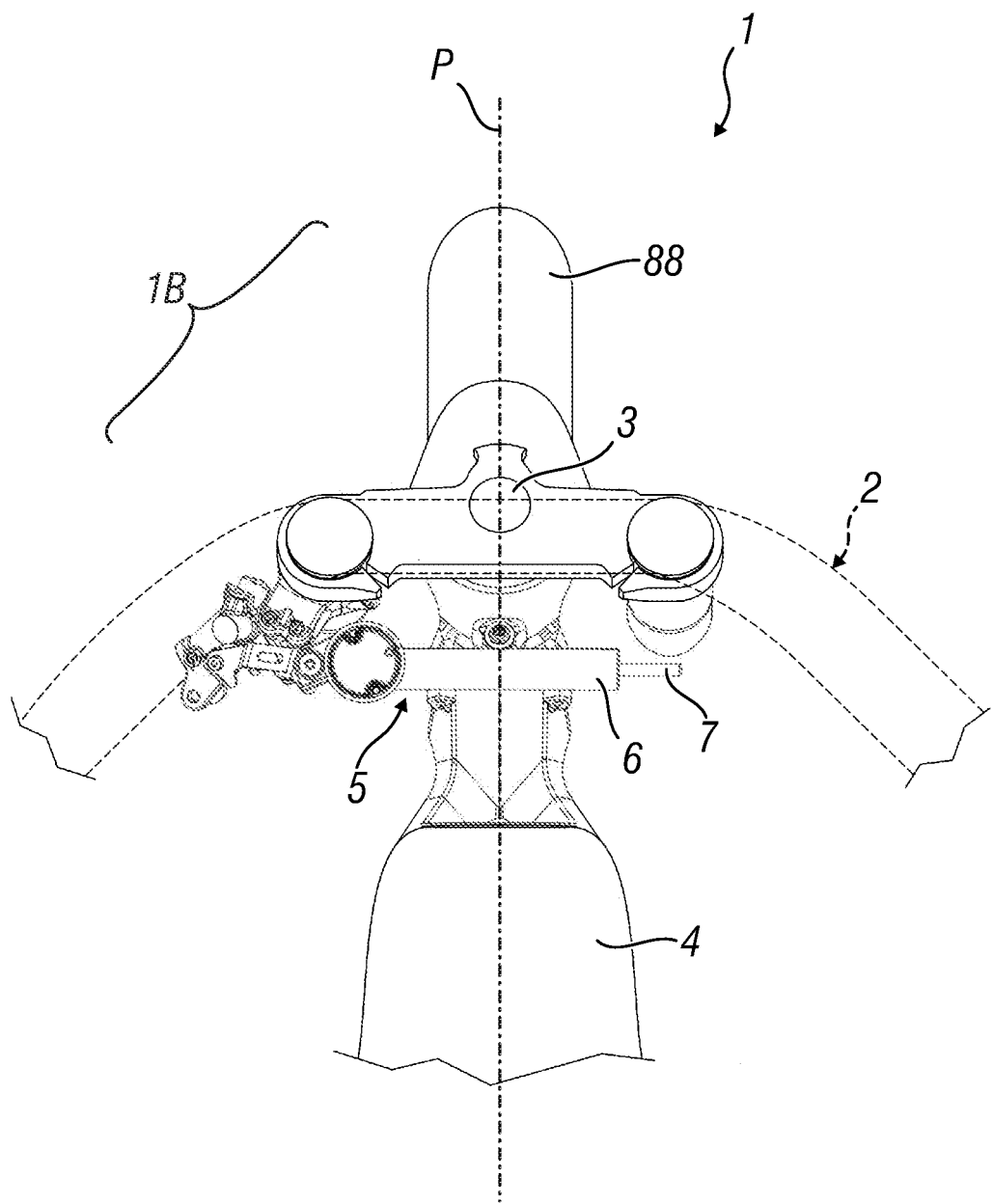

With reference to the figures mentioned, a motorcycle 1 has (diagrammatically) a front part (1A) comprising a front wheel 88, handlebars 2 rotating about a handlebar stem axis or shaft 3 and a rear part 1B comprising a normal (faired) frame 90, a fuel tank 4, a rear wheel 89 and other normal components of a motorcycle. Front part 1A and rear part 1B are connected together by means of the handlebar head in which handlebar stem 3 is located. Handlebars 2 are firmly attached to the handlebar stem and are connected to a normal front wheel of the vehicle in a known way. A steering damper 5 of the oleodynamic and electronically controlled type is firmly attached to the handlebars; this damper 5 has a sleeve or cylinder 6 attached to the frame and a piston 7 firmly attached to the handlebars. Obviously it is also possible to provide such cylinder attached to the handlebars and the piston associated with the frame, or damper 5 may be constructed in another way, which is in itself known, such that movement of the handlebars gives rise to compression of the fluid present in a first portion of the damper firmly attached to the frame by a second damper portion firmly attached to the handlebars.

Relative movement of the portion associated with the handlebars with respect to that associated with the frame makes it possible to damp out oscillations generated in the handlebars when steering the vehicle over ground, which may be a road, track or dirt track. The invention relates to the situation of a damper of an electronic type (in itself known) where the fluid (oil) present in the portion associated with the frame can move within a hydraulic circuit following the action of a valve member (electrically-operated valve) controlled by a control unit 10 which may be the central electronic unit (a microprocessor) controlling all the components (engine, suspension, brakes, warning lights, etc.) of the vehicle. Through this movement of the fluid the response of the steering damper can be varied selectively so that it can effectively counter oscillations of both the weave type and the wobble type which the motorcycle may experience when it is in motion.

Contrary to what currently happens in the state of the art, the action of the control unit or central processor unit 10 on steering damper 5 allows for optimum damping of not only angular oscillations of handlebars 2 (and the front wheel of the vehicle) about handlebar stem axis 3 with respect to a reference plane P which is the median plane of the vehicle. This action also makes it possible to optimally damp out weave of the rear part 1B of the motorcycle in comparison with front part 1A about handlebar stem axis 3.

In the first case, angular oscillation of the handlebars arises for example after the front wheel of the vehicle has reared up following acceleration or when the front wheel experiences a "wobble" to the right or left on a bend or on rough ground.

The undulation may occur as a result of lateral forces generated on the vehicle when in movement or as a result of unforeseen accelerations or for other reasons.

Controller 10 acts on steering damper 5 in three different ways or in three modes: in closed loop, adaptively or predictively when central processor unit 10 detects particular physical situations of the motorcycle such as rearing, wobble or oscillation of the weave type. These situations are detected through data reaching central processor unit 10 from at least one acceleration sensor (or accelerometer) which provides the central processor unit with acceleration data $a_x$, at least one gyroscopic sensor or gyroscope associated with the frame which provides data relating to a roll angle $\varphi$ of the vehicle, and at least one sensor detecting the speed v of the vehicle. In particular, closed loop control is based on the monitoring of a handlebar stem angle or the angular velocity of the handlebar stem and/or the frequency of oscillation of the said handlebar stem, as will be described below.

Figure 4:
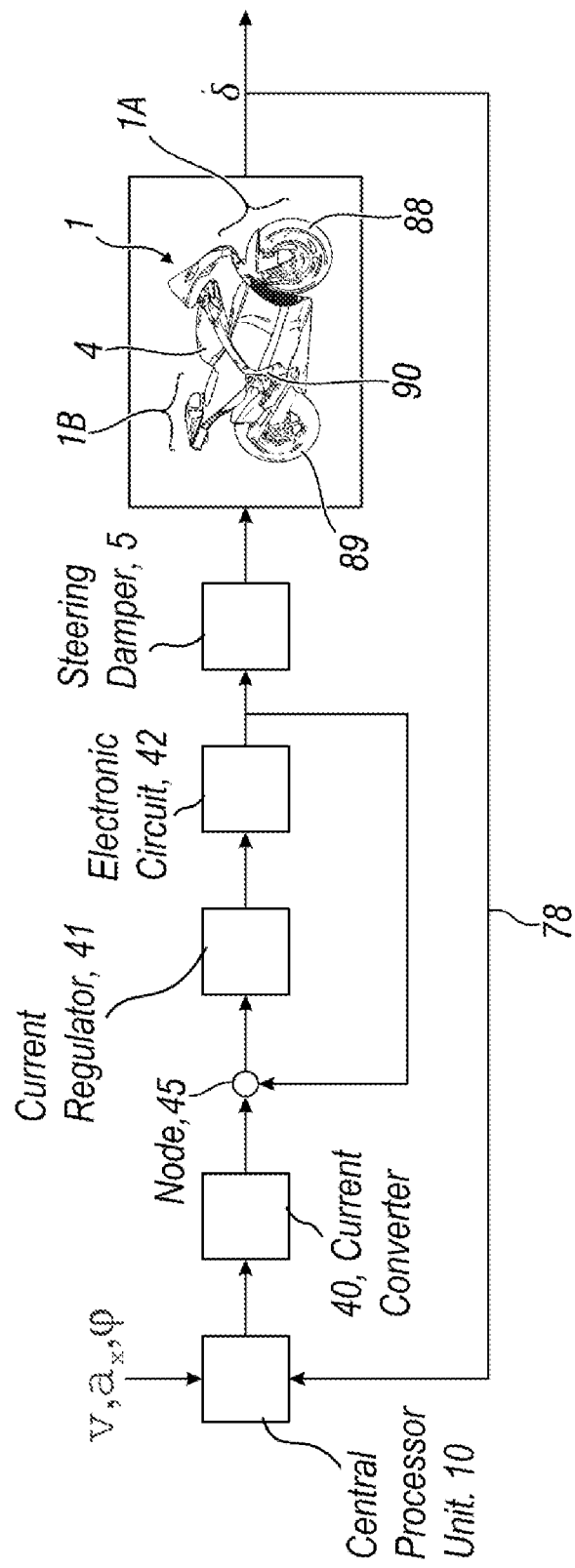
FIG. 4 shows a block diagram of the invention.

More particularly, with reference to FIG. 4, central processor unit 10 generates a signal on the basis of values received by the said sensors such as to bring about action of damper 5 to counter the vehicle's both wobble and weave.

The signal emitted by the central processor unit is converted into current by a current converter 40 which thus generates a current signal suitable for the desired action on the steering damper. This signal passes through a current regulator 41 and then through an electronic circuit which generates the effective current to control the damper's electrically-operated valve 5 (not shown). The output signal from circuit 42 is fed back at a node 45 located between converter 40 and regulator 41 so as to be able to have proper control of the signal generated towards the damper's electrically-operated valve.

Information about the angular velocity $\dot{\delta}$ of the handlebar stem also reaches central processor unit 10 through a normal rotation sensor associated therewith. The sensor is a position sensor functionally associated with handlebar stem 3. As an alternative this sensor may be a gyroscope, similar to that associated with the frame.

The sensor (not shown) generates a position signal (which in FIG. 4 is sent to the central processor unit via a branch 78) which is reduced to the derivative and filtered by central processor unit 10 to obtain data on the rotation velocity of the handlebar stem and/or the frequency of its oscillation about the handlebar stem axis with respect to plane P.

Obviously other members detecting movement of the frame or the centre of gravity of motorcycle 1 with respect to a median plane P or reference plane of the vehicle may also be included.

These sensors may be incorporated in said central processor unit 10 or may be suitably located on motorcycle 1.

With regard to the manner of functioning in an adaptive closed loop, central processor unit 10 receives data relating to the speed v, acceleration $a_x$ and roll angle $\varphi$ of the vehicle from normal sensors located on the latter, and data relating to the velocity of the handlebar stem about an axis coinciding with the longitudinal axis of handlebar stem 3. This central processor unit can then act on steering damper 5, acting on the control current (generated by circuit 42) of the electrically-operated valve in the oleodynamic circuit connected to such damper. This current value thus defines a damping coefficient for damper 5.

Figure 5:
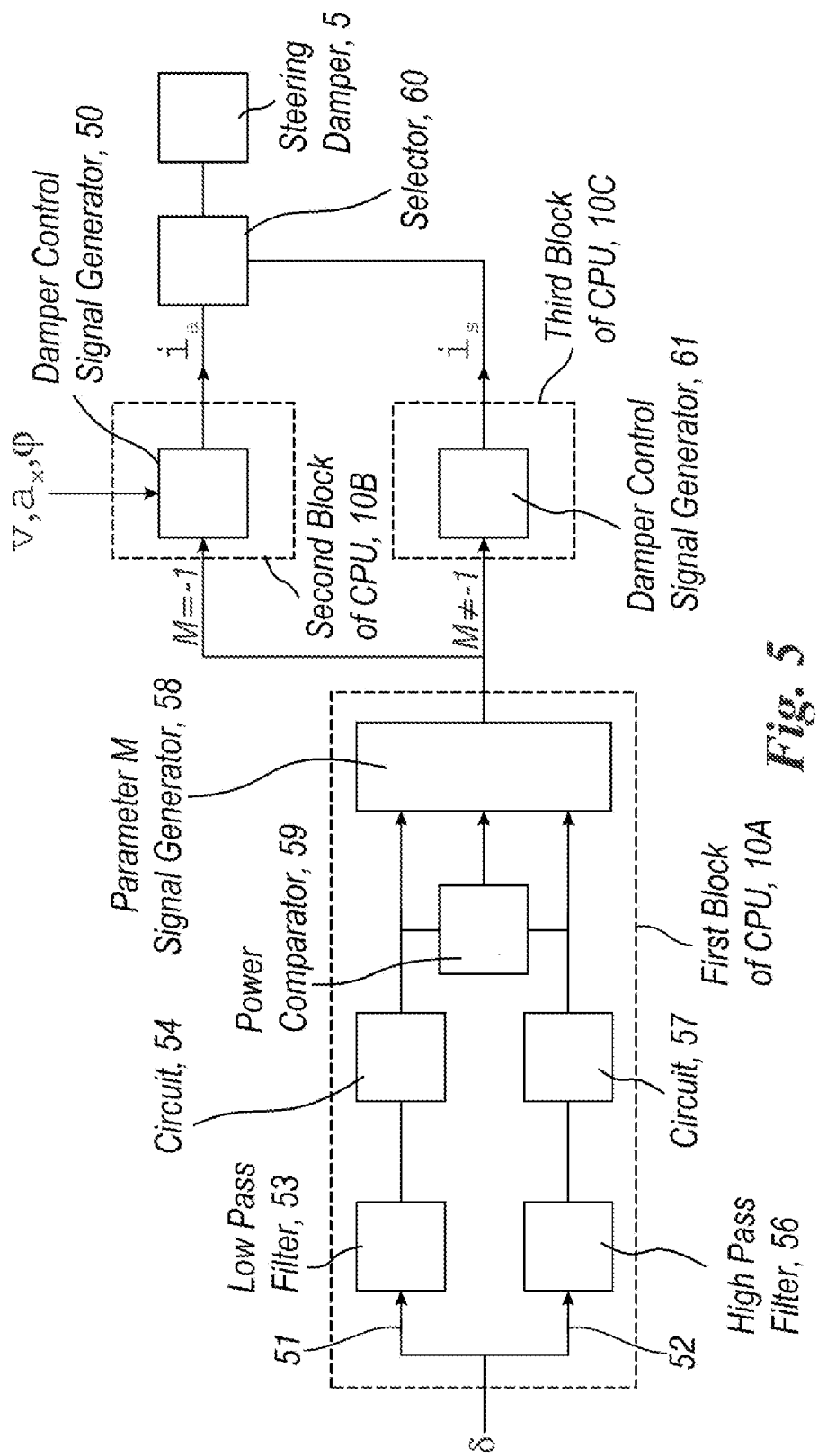
FIG. 5 shows a block diagram of part of the invention.

More particularly, with reference to FIG. 5, central processor unit 10 mainly comprises three blocks: a block 10A defining detection of the mode of action (for example on the basis of the possible detection of undulation of the motorcycle), a block 10B providing adaptive control of the motorcycle in an open loop and a block 10C which exercises closed loop control over the stability of the motorcycle (or on the basis of the handlebar stem angle and angular velocity of that handlebar stem).

At a deeper level, through block 10A which receives the velocity data for the handlebar stem, central processor unit 10 determines a parameter M which may have values of −1, 0 and 1. Value −1 corresponds to no oscillation or undesired movement of the vehicle, value 0 corresponds to an oscillation of the weave type and value 1 corresponds to an oscillation of the wobble type. If the value of M is between 0 and 1, central processor unit 10 detects the presence of both wobble and weave oscillations.

This detection takes place through the use of two digital passband filters forming part of unit or central processor unit 10 which receive the angular velocity data for the handlebar stem and filter it (as in a normal passband filter) to make it possible to identify a velocity correlated with the weave oscillation and a velocity correlated with the wobble oscillation.

In particular block 10A comprises two branches 51 and 52, which are mirror images, respectively comprising a low passband filter 53 and a circuit 54 which calculates the power of the electrical signal leaving such filter 53, and a high passband filter 56 and a circuit 57 calculating the power of the electrical signal leaving filter 56. From branch 51 it is then possible to obtain an electrical signal corresponding to the weave oscillation of the motorcycle, while from branch 52 it is possible to obtain an electrical signal corresponding to wobble movement of the vehicle.

The power of the signals defined by circuits 54 and 57 can also be compared in a power comparator 59 which is in turn connected to block 58. This power comparator 59 measures a ratio between the power of one of the signals in branches 51 and 52 and the sum thereof. This comparator for example measures the ratio $$P_{wobble}/(P_{wobble}+P_{weave})$$

Calculation of the value of M (and therefore the identification of weave and/or wobble movements) is performed by block 58 by determining the magnitude of the powers of the aforesaid signals and the ratio between them. In particular:

a) If $P_{weave} < P_{threshold}$ and $P_{wobble} < P_{threshold}$ no movement is detected: M=−1. In this case the steering damper works on the basis of control based on the vehicle's parameters (acceleration, speed). This way to work is defined as "adaptive" because it adapts to the vehicle travel conditions which are defined by said parameter, of acceleration, speed and roll.

b) If $P_{weave} > P_{threshold}$, but $P_{wobble} < P_{threshold}$, the presence of weave is detected: M=0;

c) If $P_{wobble} > P_{threshold}$, but $P_{weave} < P_{threshold}$, the presence of wobble is detected: M=1.

In case b) there is in fact a weave movement, in case c) a wobble movement.

It will be noted that the signals detected make it possible to generate a command signal for the steering damper (a signal defined by the value M) which adopts discrete values (0 and 1), that is such signal is of the binary type. The action of controlling the steering damper will consequently also be discrete, that is according to two predetermined modes.

d) If instead both the values for the power $P_{weave}$ and $P_{wobble}$ are above the threshold value (as an absolute value, in relation to the high pass filter or low pass filter), this makes it possible to detect the simultaneous presence of both wobble and weave, so the value of M is set to be equal to the ratio of the powers leaving power comparator 59 (which by definition is a number of between 0 and 1). In this case the corresponding control signal is a continuous signal.

Thus the handlebar stem velocity signals make it possible to define wobble and weave movements through filtering them.

Since in cases b), c), d) the control to apply to the stem handlebar depends on the stem handlebar movements, said control is defined as close loop.

More particularly, with reference to FIG. 5, one possible block diagram for the invention comprises abovementioned blocks 10A, B and C. A signal corresponding to previously indicated value M issues from block 10A: if M is equal to −1, the signal from block 10A reaches only block 10B which controls handlebar stem damping through an architecture similar to that in FIG. 4 (that is with a current converter, current regulator and circuit controlling electrically-operated valve of damper 5) and that is through an electronic circuit 50 which generates a control current $i_a$ for the electrically-operated valve of damper 5.

If the value of M is other than −1, then control is of the closed loop type (where the controlled variable—the handlebar stem angle or handlebar stem angular velocity—is also used to decide on the action of damper 5) and the signal leaving block 10A passes to block 10C. Depending upon the input value this block is capable of generating a current signal $i_s$ such as to be able to control the electrically-operated valve of damper 5. In cases b) and c) mentioned above the current value will be such as to compensate for individual weave or wobble movements, while in case d) the current signal generated by block 58 will be such as to control the rigidity of steering damper 5 so as to compensate for both combined movements.

The damper control signal $i_s$ (discrete or continuous) can vary over time and may depend on the value of M in a linear manner or on the basis of one or more predetermined graphs implemented in block 61 so as to have the desired control of damper 5 and therefore action to block wobble and/or weave movements of the vehicle.

Signals $i_a$ and $i_a$ generated by blocks 10B and 10C (alternatively to each other) reach a selector 60 which according to their presence allows them to pass to the electrically-operated valve of damper 5.

To sum up, any unexpected movement of the motorcycle is then detected in block 10A of the central processor unit or unit 10 which on the basis of this activates block 10B, when there is no oscillation and M=−1, or block 10C when there is at least one oscillation and M is other than −1. If block 10B is activated, central processor unit 10 also makes a check on the vehicle on the basis of speed, acceleration and roll data and adjusts the action of steering damper 5 to the "current" steering condition. If block 10C is activated, central processor unit 10 applies closed loop control to the vehicle to counter at least one of the wobble and weave oscillations found. This is on the basis of "feedback" data for the handlebar stem speed δ and its angle of rotation (see FIG. 4).

Blocks 10B and 10C independently generate current signals $i_a$ and $i_s$ which are alternatively used to command and control steering damper 5 through controlling the electrically-operated valve in the oleodynamic circuit to which it is connected. This as described above.

Figure 2:
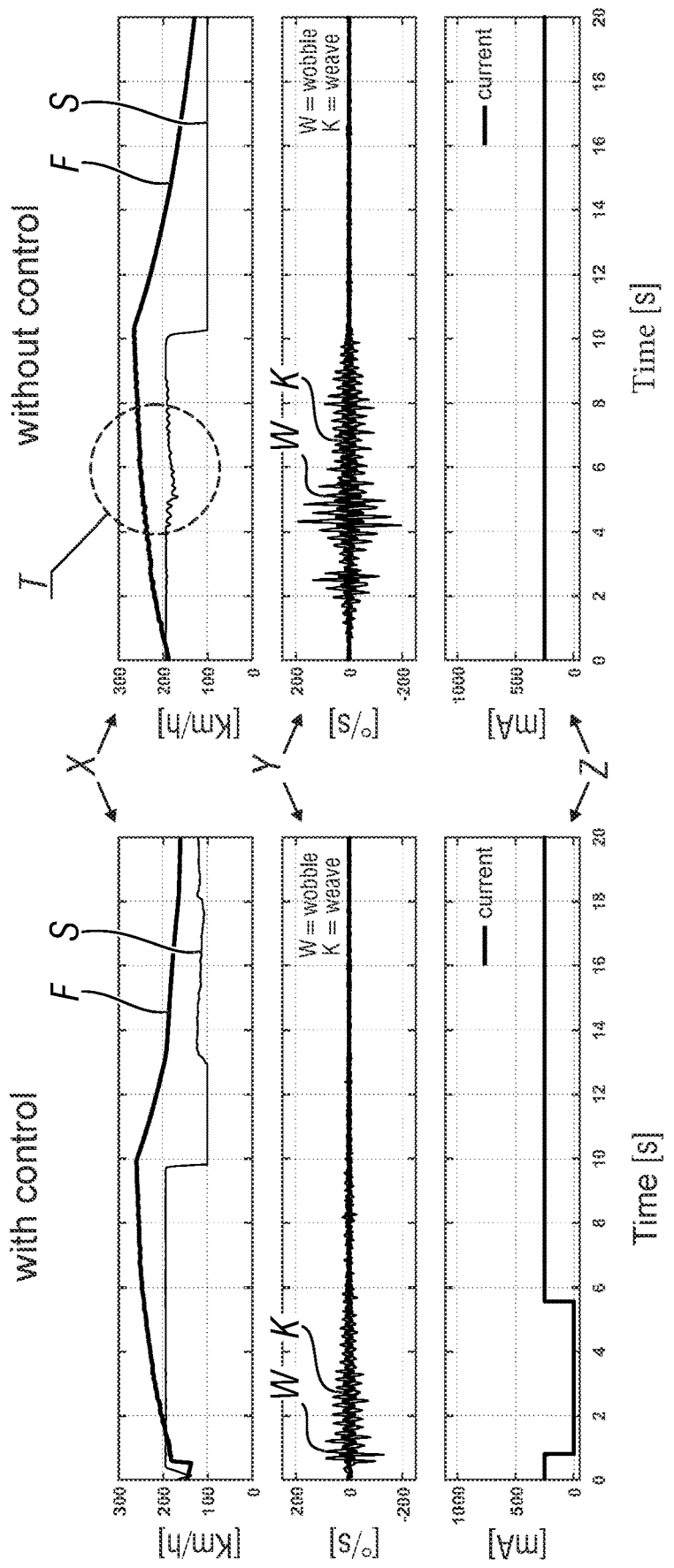

One example of the functioning of central processor unit 10 may be seen by comparing graphs W, Y and Z in part A and part B of FIG. 2. Part A of FIG. 2 shows the situation where closed loop control by central processor unit 10 does not take place and the damper is set for rigid mode; in part B of FIG. 2 on the other hand there is the situation of closed loop control of the steering damper; again in this case the damper is initially set in rigid mode.

As can be seen, each graph X comprises a graph F relating to the speed of the motorcycle. Graph F rises when the rider accelerates and falls when he decelerates.

The graph also comprises a graph S which identifies by how much the "throttle" has been opened up, that is the position of the accelerator handle; when the graph has a step there is a fall in speed ("easing off the throttle"), while every discontinuity in the graph indicates instantaneous changes in the acceleration of the vehicle. The value 200 indicates full acceleration ("throttle opened up"), the value 100 indicates one stage in acceleration ("throttle shut down" or "eased off").

In the graph in part A it will be noted that the graph S has an oscillation (see circle T, which is not present in graph X in part B of FIG. 2). This oscillation occurs when an oscillation (wobble) in the handlebar stem (graph W) in graph Y in part A of FIG. 2 occurs and there is corresponding oscillation or weave of the rear part 1B of the motorcycle indicated by graph K. These graphs indicate signals for the handlebar stem angular velocity which are filtered by filters 56 and 53 respectively in FIG. 5.

As will be seen from graph Z in part A of FIG. 2, these oscillations are not compensated for by steering damper 5 (which is set in constant rigid mode as shown by the currents feeding the electrically-operated valve in the circuit controlling it) and the rider can only compensate for the oscillations by "easing off the throttle" (see graph 5, which creates a step). Only after this action do the oscillations in graphs W and K cease (or fall to values which have no influence on steering).

Thus in a situation in which the invention does not operate (part A in FIG. 2) the oscillations of the motorcycle (graphs W and K) lead to oscillation of the handlebar stem to the point where the driver eases off the throttle (see graph X in part A of FIG. 2).

In the situation in part B of FIG. 2 showing the action of central processor unit 10 described above, when the oscillations shown by graphs W and K occur a current having a constant value below the reference value (the situation where oscillations are absent) is immediately generated; with this change in current the handlebar stem can be quickly stabilised and the oscillations can be damped out, benefiting steering of the motorcycle, without the rider having to ease off the throttle. In fact graph 5 is constant at the value 200 even when there are oscillations in graphs W and K.

Figure 3:
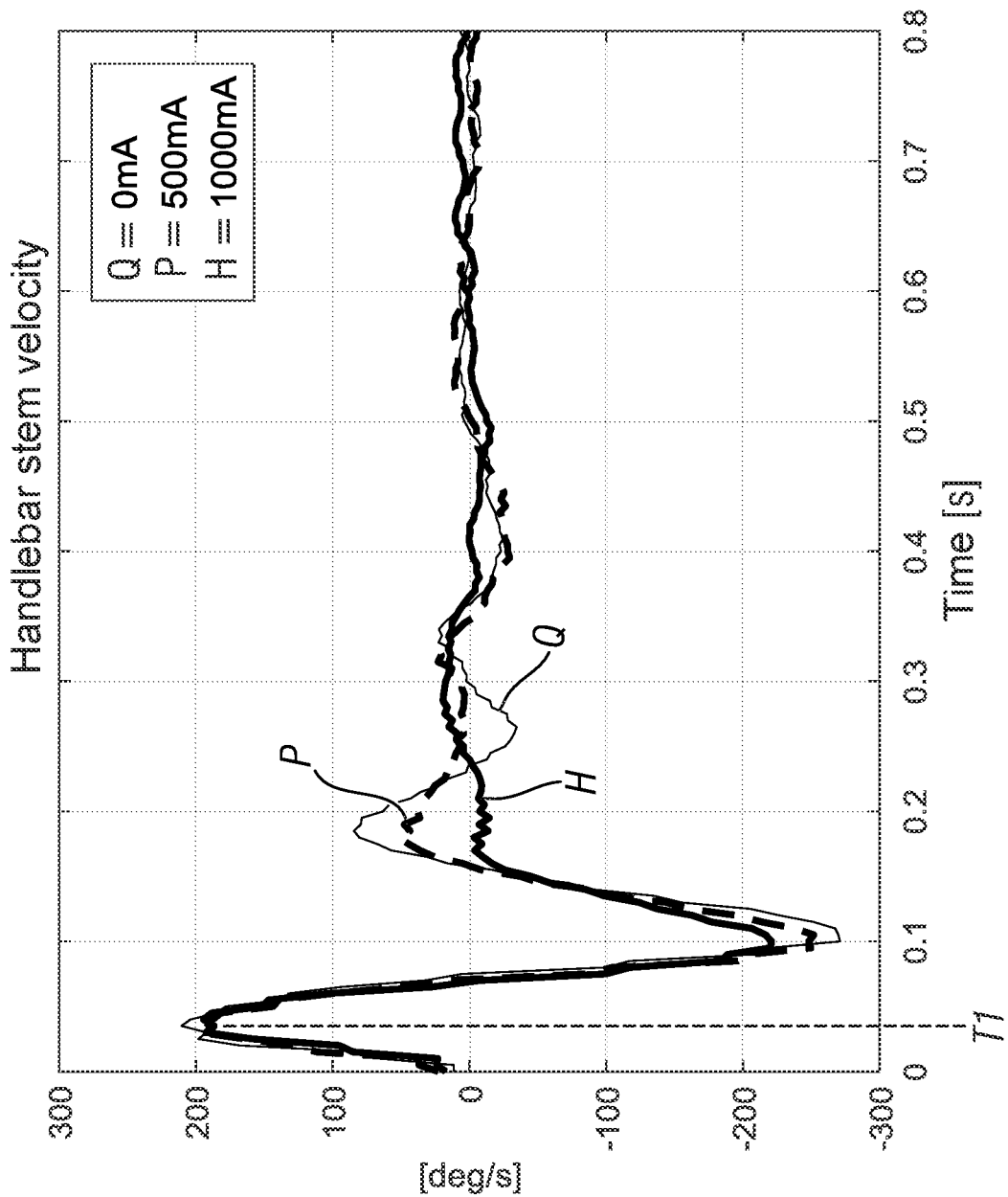
FIG. 3 shows a graph of time/angle of rotation of the handlebar stem showing graphs of the damping of oscillations of the handlebar stem of the motorcycle after the latter has reared up, obtained for different control currents of the steering damper.

As previously indicated, the action of central processor unit 10 on steering damper 5 may also be of the predictive type, that is the system is capable of adjusting its action before particular events occur. For example, with reference to FIG. 3, unit 10 may also detect return of the vehicle (through the sensors mentioned above) after rearing up with simultaneous rotation of the handlebars (or shaft 3) about plane P through a variable angle as shown in FIG. 3. This unit 10 may act to stiffen the steering damper and therefore the handlebars before the latter begin to rotate.

In FIG. 3 graphs Q, P and H represent the change in the angle of the handlebar stem or handlebar stem shaft 3 with respect to a 0° position (presented when the front wheel rests on the ground at time T=0) obtained with different control currents for the steering damper.

Return from rearing up is detected from T=0 by known means (for example based on detection of the speed of the motorcycle's front wheel).

When the front wheel of the vehicle touches the ground central processor unit 10 acts on damper 5 to prepare it to act in order to damp out the wobble oscillations in handlebars 2. Control unit or central processor unit 10 generates an appropriate current to act on the electrically-operated valve associated with steering damper 5 to prepare it so that it can quickly damp the wobble of the handlebars or have an immediate damping effect on the oscillations of the handlebars around the median plane P of the motorcycle. As may be seen in FIG. 3, the oscillations quickly cease with a high feed current to the electrically-operated valve of the steering damper (1000 mA, in the figure, as shown by graph H) which immediately stiffens the damper.

Thus, thanks to the invention, unit or central processor unit 10 is capable of preparing the steering damper for the best possible action according to at least the detected rotation conditions of the handlebars or handlebar stem shaft 3 and the speed of the vehicle before a complete oscillation of handlebars 2 with respect to reference plane P takes place, or before such handlebars or the wheel attached to them has completed a displacement towards one side of such plane and a subsequent displacement towards the opposite side (or has performed a complete movement from the starting point to the same point). This in situations of wobble of the front wheel of the motorcycle when accelerating or taking a bend. If it should rear up, the distance of the front wheel from the ground may also be added to such conditions.

The invention therefore enables the rider to steer the motorcycle in an optimum way even under difficult conditions and to quickly retake or keep full control of the vehicle both when steering on the road with the wheels on the ground and when applying maximum acceleration or in cases of rearing where the front wheel tends to rise up.

A preferred embodiment of the invention has been described. Others are yet possible in the light of the following claims.

The invention claimed is:

1. A motorcycle having a front part and a rear part,
the front part comprising handlebars, a handlebar stem shaft and a front wheel,
the rear part comprising a frame of the motorcycle, a rear wheel and a tank,
an electronic steering damper comprising a first portion firmly attached to the frame and a second portion firmly attached to the handlebars or another part associated with said handlebar stem,
said steering damper being electronically controlled by a control unit which controls the action of the steering damper itself on such part of the handlebar stem,
provision being made for a device detecting the angle of rotation of such part of the handlebar stem and/or the velocity of rotation of the handlebar stem shaft within a handlebar head of the frame and devices detecting the speed and angular velocity of such frame,
the control unit comprising a first block which receives data on the velocity of rotation of the handlebar stem shaft, said first block identifying the presence of a wobble movement in the handlebars through analysing a parameter linked to the velocity of rotation of the handlebar stem in the handlebar head and/or its frequency of oscillation,
said first block of said control unit being connected to a second block and a third block in such control unit wherein, depending upon the determination made by the first block, either the second block or the third block receives a corresponding signal from the first block and generates a control signal directed to the steering damper,
wherein the first block defines two electrical signals from the data on the velocity of rotation of the handlebar stem shaft, said two signals corresponding respectively to an oscillation movement of the motorcycle or weave and an oscillation of the handlebars or wobble,
comparator means capable of comparing such electrical signals to define a parameter through which said first block identifies the simultaneous or individual and separate existence of weave and wobble movements of the motorcycle being provided, the control unit acting on the steering damper through said
control signal in relation to said parameter so that the
damper damps both weave oscillation movements and
wobble oscillation movements, wherein the first block comprises two passband filters to filter said handlebar stem velocity data and to separate said filtered data by frequency so as to be able to identify two electrical signals with different frequencies corresponding with certainty to different weave and/or wobble movements, wherein the comparator means is a power comparator capable of comparing the power of the filtered frequency-separated signals corresponding to the weave movement and the wobble movement, such power comparator performing a mediated comparison of said powers so as to define the parameter through which the first block of the control unit determines the presence of a simultaneous or independent weave movement and wobble movement, wherein provision is made for a threshold power $P_{threshold}$ against which all the powers of the signals defining weave and wobble movements, $P_{weave}$ and $P_{wobble}$, are compared, said power comparator detecting one of the following conditions:

a) $P_{weave} < P_{threshold}$ and $P_{wobble} < P_{threshold}$, or
b) $P_{weave} > P_{threshold}$ and $P_{wobble} < P_{threshold}$, or
c) $P_{wobble} > P_{threshold}$ and $P_{weave} < P_{threshold}$, said power comparator determining in relation to such conditions the parameter corresponding to a control signal having a discrete value 0 or 1 identifying the presence of a weave movement or wobble movement in the cases in conditions b) and c), or identifying the absence of each of these movements in the case of condition a).

2. The motorcycle according to claim 1, wherein the control signal is a current signal which in the absence of both said weave and/or wobble movements is a function only of the motorcycle's actual speed, acceleration and roll values for control of the steering damper and which in the presence of at least one of such weave and/or wobble movements is a function of a feedback value of said velocity of rotation and/or handlebar stem oscillation frequency, said current signal controlling said steering damper to damp the weave and/or wobble movement.

3. The motorcycle according to claim 1, wherein the filters are a low pass band filter and a high pass band filter.

4. The motorcycle according to claim 1, wherein in the situation in which both $P_{weave}$ and $P_{wobble}$ are greater than $P_{threshold}$, the power comparator determines that both wobble and weave movements are present simultaneously, said power comparator consequently defining the parameter corresponding to a control signal for the steering damper having a continuous value between 0 and 1 and defined on the basis of the formula $P_{wobble}/(P_{wobble}+P_{weave})$.

5. The motorcycle according to claim 1, wherein the device for detecting the velocity of rotation of the handlebar stem shaft comprises a position sensor associated with the handlebar stem shaft or a gyroscope or other rotation sensor associated with such handlebar stem shaft, said position sensor or gyroscope or other rotation sensor detecting data on the velocity of rotation of the handlebar stem shaft,
the angular velocity of the frame of the motorcycle being determined by a further gyroscope.

6. The motorcycle according to claim 1, wherein said control unit is an electronic control unit which commands and controls the delivery of power to the engine and other devices of the vehicle.

7. The motorcycle according to claim 1, in which the electronically controlled steering damper comprises a sleeve or cylinder and a piston moveable therein, a first of such sleeve or cylinder and the piston being firmly attached to the frame of the motorcycle and the second of such sleeve or cylinder and the piston being firmly attached to the handlebars, provision being made in the steering damper for a hydraulic circuit comprising a valve component controlled by said control unit, wherein the action of said unit on said steering damper is of the predictive type.

8. The motorcycle according to claim 7, wherein, if the motorcycle returns from rearing up, the control unit is capable of generating a command current signal for such electrically-operated valve such as to prepare the steering damper to act on the handlebars so that there is rapid damping of the oscillation or wobble of the handlebars before the front wheel has completed a complete oscillation of the handlebars with respect to a reference plane or the median plane of the motorcycle before touching the ground.

9. The motorcycle according to claim 1, wherein said command signal is a high intensity current signal, greater than at least 700 mA.

10. The motorcycle according to claim 1, wherein said command signal is a high intensity current signal, greater than 1000 mA.

11. The motorcycle according to claim 1, wherein the part of the handlebar stem to which the second portion is firmly attached comprises the handlebars.

12. The motorcycle according to claim 1, wherein said control unit is an electronic control unit which commands and controls the delivery of power to the engine and suspensions and/or brakes of the vehicle.

13. A motorcycle having a front part and a rear part,
the front part comprising handlebars, a handlebar stem shaft and a front wheel,
the rear part comprising a frame of the motorcycle, a rear wheel and a tank,
an electronic steering damper comprising a first portion firmly attached to the frame and a second portion firmly attached to the handlebars or another part associated with said handlebar stem,
said steering damper being electronically controlled by a control unit which controls the action of the steering damper itself on such part of the handlebar stem,
provision being made for a device detecting the angle of rotation of such part of the handlebar stem and/or the velocity of rotation of the handlebar stem shaft within a handlebar head of the frame and devices detecting the speed and angular velocity of such frame,
the control unit comprising a first block which receives data on the velocity of rotation of the handlebar stem shaft, said first block identifying the presence of a wobble movement in the handlebars through analysing the parameter linked to the velocity of rotation of the handlebar stem in the handlebar head and/or its frequency of oscillation,
said first block of said control unit being connected to a second block and a third block in such control unit wherein, depending upon the determination made by the first block, either the second block or the third block receives a corresponding signal from the first block and generates a control signal directed to the steering damper, wherein the first block defines two electrical signals from the data on the velocity of rotation of the handlebar stem shaft, said two signals corresponding respectively to an oscillation movement of the motorcycle or weave and an oscillation of the handlebars or wobble, comparator means capable of comparing such electrical signals to define a parameter through which said first block identifies the simultaneous or individual and separate existence of weave and wobble movements of the motorcycle being provided, the control unit acting on the steering damper through said control signal in relation to said parameter so that the damper also damps both weave oscillation movements and wobble oscillation movements, wherein, if the motorcycle returns from rearing up, the control unit is capable of generating a command current signal for such electrically-operated valve such as to prepare the steering damper to act on the handlebars so that there is rapid damping of the oscillation or wobble of the handlebars before the front wheel has completed a complete oscillation of the handlebars with respect to a reference plane or the median plane of the motorcycle before touching the ground.

14. The motorcycle according to claim 13, wherein the first block of the control unit comprises two passband filters to filter said handlebar stem velocity data and to separate said filtered data by frequency so as to be able to identify two electrical signals with different frequencies corresponding with certainty to different weave and/or wobble movements.

15. The motorcycle according to claim 14, wherein the comparator means is a power comparator capable of comparing the power of the filtered frequency-separated signals corresponding to the weave movement and the wobble movement, such power comparator performing a mediated comparison of said powers so as to define the parameter through which the first block of the control unit determines the presence of a simultaneous or independent weave movement and wobble movement.

16. The motorcycle according to claim 14, wherein the filters are a low pass band filter and a high pass band filter.

17. The motorcycle according to claim 13, wherein the control signal is a current signal which in the absence of both said weave and/or wobble movements is a function only of the motorcycle's actual speed, acceleration and roll values for control of the steering damper and which in the presence of at least one of such weave and/or wobble movements is a function of a feedback value of said velocity of rotation and/or handlebar stem oscillation frequency, said current signal controlling said steering damper to damp the weave and/or wobble movement.

18. The motorcycle according to claim 13, wherein the device for detecting the velocity of rotation of the handlebar stem shaft comprises comprising a position sensor associated with the handlebar stem shaft or a gyroscope or other rotation sensor associated with such handlebar stem shaft, said position sensor or gyroscope or other rotation sensor detecting data on the velocity of rotation of the handlebar stem shaft, the angular velocity of the frame of the motorcycle being determined by a further gyroscope.

19. The motorcycle according to claim 13, wherein said control unit is an electronic control unit which commands and controls the delivery of power to the engine and other devices of the vehicle.

20. The motorcycle according to claim 13, in which the electronically controlled steering damper comprises a sleeve or cylinder and a piston moveable therein, a first of such sleeve or cylinder and the piston being firmly attached to the frame of the motorcycle and the second of such sleeve or cylinder and the piston being firmly attached to the handlebars, provision being made in the steering damper for a hydraulic circuit comprising a valve component controlled by said control unit, wherein the action of said unit on said steering damper is of the predictive type.

* * * * *